US010664893B2

(12) United States Patent
Herbst et al.

(10) Patent No.: US 10,664,893 B2
(45) Date of Patent: May 26, 2020

(54) SYSTEM TO CUSTOMIZE RECOMMENDATIONS BY SOLICITING AND ANALYZING SUGGESTIONS AND EVALUATIONS TAILORED TO A PARTICULAR SUBJECT

(71) Applicant: Social Data Sciences, Inc., Arlington, VA (US)

(72) Inventors: Daniel C Herbst, Arlington, VA (US); Sean P Finegan, Los Angeles, CA (US)

(73) Assignee: Social Data Sciences, Inc.

( * ) Notice: Subject to any disclaimer, the term of this patent is extended or adjusted under 35 U.S.C. 154(b) by 386 days.

(21) Appl. No.: 15/447,427

(22) Filed: Mar. 2, 2017

(65) Prior Publication Data

US 2017/0255986 A1 Sep. 7, 2017

Related U.S. Application Data

(60) Provisional application No. 62/302,340, filed on Mar. 2, 2016, provisional application No. 62/401,170, filed on Sep. 29, 2016.

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0631* (2013.01); *G06Q 30/0282* (2013.01); *G06Q 30/0609* (2013.01); *G06Q 30/0613* (2013.01)

(58) Field of Classification Search
CPC ..... G06Q 30/06; G06Q 30/0601–0643; G06Q 30/08; G06Q 50/01
See application file for complete search history.

(56) References Cited

U.S. PATENT DOCUMENTS

| | | | |
|---|---|---|---|
| 9,703,838 B1* | 7/2017 | Hampson | G06F 16/24578 |
| 2009/0144133 A1* | 6/2009 | Cha | G06Q 30/02 705/7.33 |
| 2011/0184945 A1* | 7/2011 | Das | G01C 21/206 707/724 |
| 2015/0278917 A1* | 10/2015 | Stoll | G06O 30/0631 705/26.7 |

(Continued)

OTHER PUBLICATIONS

The Influence of Interactivity and Online Store Atmospherics of a 3-D Retail Store in Second Life on Consumer Purchase Intentions. Avantika Thombre, B.Eng. Aug. 2011. (Year: 2011).*

*Primary Examiner* — William J Allen
(74) *Attorney, Agent, or Firm* — Pacifica IP

(57) ABSTRACT

Methods and apparatus for a system that solicits suggestions and evaluations of options (for goods, services, business/personal relationships, decisions, etc.) tailored to a subject. The evaluators, which may include the subject, provide input on the options (a rating, ratings, written evaluation, etc.) with respect to the subject. After receiving one or more such evaluations, the system may formulate a recommendation for the subject. If so, the system may notify the subject, evaluators, and/or other parties. It may also take appropriate actions to facilitate the recommendation (i.e., make a product available for sale, email a coupon, pass along a résumé, exchange contact information, etc.).

2 Claims, 6 Drawing Sheets

(56) References Cited

U.S. PATENT DOCUMENTS

2015/0319203 A1* 11/2015 Jeremias ................ H04L 51/20
  715/753
2016/0248711 A1* 8/2016 Huo ........................ H04L 51/32

* cited by examiner

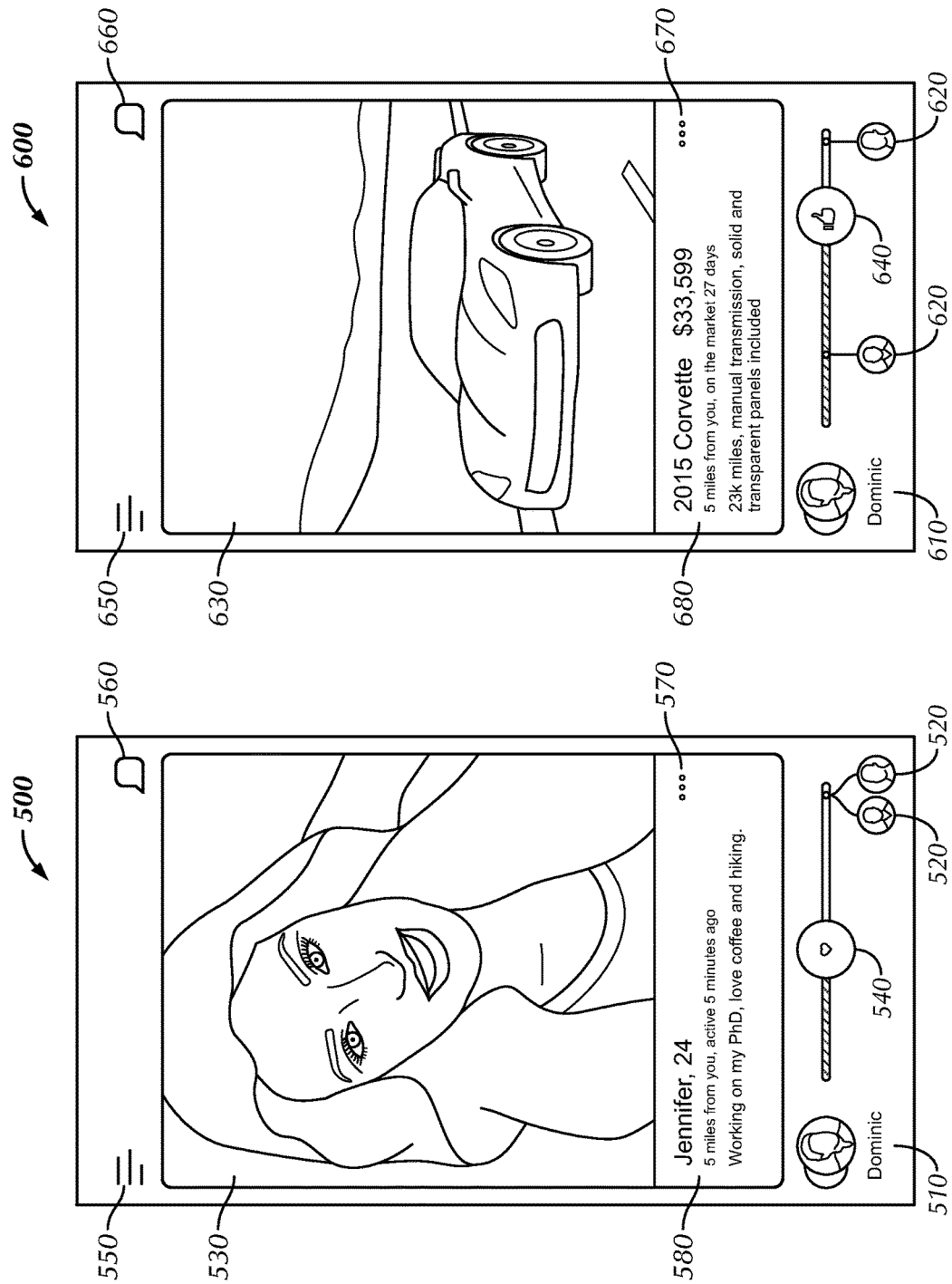

SYSTEM TO CUSTOMIZE RECOMMENDATIONS BY SOLICITING AND ANALYZING SUGGESTIONS AND EVALUATIONS TAILORED TO A PARTICULAR SUBJECT

CROSS-REFERENCE TO RELATED APPLICATIONS

This application claims priority under 35 U.S.C. § 119(e) from U.S. Provisional Patent Application No. 62/302,340, by Sean P. Finegan and Daniel C. Herbst, "Electronic Recommendation System" filed Mar. 2, 2016, and Provisional Patent Application No. 62/401,170, by Sean P. Finegan and Daniel C. Herbst, "Electronic Evaluation System" filed Sep. 29, 2016, which, by this statement, are incorporated herein by reference for all purposes.

BACKGROUND OF THE INVENTION

Field of the Invention

The present invention relates to the field of computer software systems that make recommendations.

Background of the Invention

Recommendation systems have become ubiquitous in the Digital Age—commercial websites recommend products and services to purchase, media websites recommend content to view, social websites recommend people to meet, etc. To make these recommendations, the systems collect information—implicit data such as purchasing patterns, and explicit data such as ratings. These data are analyzed by the system to make targeted recommendations to users. To collect ratings on a product, for example, a typical system may ask prior buyers to give a numerical rating and a written review of the product. The reviewers, however, are not told to rate with any particular consumer in mind, or are merely asked to rate their own personal experiences. This style of user review works well for objective questions, but fails miserably for subjective questions, especially for polarizing items.

As an example, consider a tool that is clumsy for right-handed people, but a godsend for left-handed people. In this case, any rating is inherently nonsensical without knowing the handedness of the hypothetical target. If users are asked to rate on behalf of themselves, the system will receive a mix of both extremes. Combining these ratings results in a middling average, which is not representative of either set of users. If users are asked to rate on behalf of others in general, they may have a dilemma. Even a right-handed user who despises the tool may recognize its utility for left-handed people. It is impossible to accurately express the evaluation in a one-size-fits-all numerical rating. As a result, reviewers are forced to make written reviews to express any caveats, which then must be laboriously traversed by readers. What is needed is a system that collects ratings from users with the needs and unique attributes of a particular subject in mind.

Another issue in recommendation systems is establishing trust in the reviews. When the reviewers are unknown to the consumer, it is difficult for the system to convince the consumer to trust the reviews. Some recommendation systems have to contend with fake reviews or paid reviewers. Even if reviewers are verified, reviewers always differ in expertise and familiarity with the product. Therefore, users are often not able to rely on average ratings, and are forced to sift through each product listing and read the lengthy review text. What is needed is a system where reviewers are known to the person searching for a product.

BRIEF SUMMARY OF THE INVENTION

The present system uses a collection of automated subsystems and associated databases that work in combination with input from one or more users (Evaluators) to produce personalized recommendations of Option(s) that best address the particular needs/wants (Decision) of a target (Subject).

Three roles are defined for clarity: Subject, Suggester, and Evaluator. Users may opt into certain roles, or the system may assign roles, or the roles may be implicit. A user's interface with the system may differ depending on the user's role. A given user may serve in more than one role, and some roles may be performed by algorithm. For example, a Subject may suggest some Options, and may be selected to evaluate some Options. The system gathers Options from Suggesters, selects Evaluators to provide reviews and/or feedback tailored to the Subject, distills and analyzes the Evaluators' input, and issues a Recommendation for the best Option(s) to satisfy the Decision. The preferred embodiment addresses specific pitfalls that naturally arise in such a system.

For each Recommendation to be made, the system identifies or establishes the nature of the Decision, and the Subject involved. The Decision may come from the Subject, from other users, from an algorithm, or it may be implied by the nature of the embodiment. Next, the system identifies potential Options that could satisfy the Decision. Each Option consists of a description and possibly other pertinent information. Some Options may be suggested directly by the Subject or from Evaluators during the course of evaluating other Options. Others may come from third-party Suggesters, whose role is to input Options into the system, and/or match existing Option(s) with Decision(s). Once the system has at least one suggested Option, it may begin gathering evaluations; however, it may continue to gather new Options continually.

The system maintains a running score or ranking for each Option; the system may also track its estimated certainty of each score/rank. The system may score Options by running a preliminary statistical analysis of any Evidence available, including previous usage behavior, correlations between similar Options and users, etc. Then, the system identifies appropriate Evaluators to solicit, based on their background and relationship to the Subject and/or Option, based on the calculated scores and certainties, and based on the availability of Evaluators. Each selected Evaluator is asked to provide input on some aspect of the Options on behalf of the Subject, such as rating or ranking Options, choosing the perceived best Option, or giving a review or testimonial for an Option. Evaluators may also be given the chance to suggest other Options, which are then registered in the system. Based on the incoming results, the system may ask the Evaluators different questions, or solicit additional Evaluators.

The system analyzes the evaluations as they arrive and updates the scores/rankings by re-running the statistical model. If at some point one or more Options has a sufficient score and certainty, the system may issue a Recommendation (subject to availability, user activity, etc.). If so, the system may notify certain parties including the Subject, Suggesters, and/or Evaluators. The system may also generate a personalized report for the Subject supporting the Recommendation, including ratings, reviews, or testimonials from one or more Evaluators. The report may contain a link or other mechanism to facilitate the Subject's acting on the Option. For example if the Option is a product, the system may offer the Option for purchase. Finally, the system collects feedback on the outcome of the Recommendation. This feedback, combined with the evaluations, allows the system to make astute inferences about Subjects, Suggesters, Evaluators, and Options to inform future Recommendations.

The present system requires a computerized system for several reasons. First, it surpasses the complexity manageable by a human (e.g., see note to 333). For example, the system is able to analyze the prior rating behavior of each Evaluator and the outcomes of prior Recommendations, resulting in better Recommendations for the Subject. Second, it manages the choice of which Suggesters and Evaluators to ask for ratings (e.g. see note to 326), drawing on the prior usage history of each Evaluator, which may not be known to the person requesting a Recommendation. Third, it handles asynchronicity: From a Subject's point of view, the Evaluators do not have to be active simultaneously. From an Evaluator's point of view, the system can organize requests for ratings such that the Evaluator is neither bored nor overwhelmed (e.g., see notes to 326, 331), and similarly for Suggesters (e.g., see notes to 326).

The present invention produces improved recommendations while providing a social experience. From the Subject's point of view, he or she receives tailored recommendations based on reviews from known and/or appropriately chosen reviewers. The reviews and ratings are made with the Subject's specific situation and personal needs in mind. The Subject can trust the reviews because they come from people personally known to the Subject, or from people with expertise in the Subject's stated needs. Further, the process of searching and recommending becomes a social experience. From a reviewer's point of view, the system offers several advantages, as well. The reviewer is no longer faced with making a review for a generic target user; by considering a specific target user, the reviewer has the more concrete task of evaluating the item in regard to the Subject's specific needs. Evaluators may be more likely to help out a friend by making a review than they are to write a review for the public at large. Additionally, by collaborating with a specific Subject on a search, the Evaluator and Subject can develop or further their social connection. Finally, the system gives an outlet for expert reviewers who specialize in certain types of searches, e.g. matchmakers or real-estate agents, that can be recompensed for their participation.

In a preferred embodiment, the system has features tailored to resolve the specific technical hurdles that arise from having a Subject-centric recommendation system. First, generating tailored evaluations requires lead time compared to showing historical reviews. Therefore, the system introduces a component called the Suggester, who may be a user or algorithm. Second, the system needs a component that can carefully select appropriate Evaluators based on need and prior history. The number of item-Subject pairs is combinatorially more numerous than just the number of items, so the system cannot assume that every evaluator can review every possible item-Subject combination.

The system employs a variety of measures to organize the interaction of the components to solve this technical issue. The system must balance getting enough evaluations to make a solid and convincing Recommendation and not overtaxing the Evaluators. For example, the system makes a deliberate calculation to determine which evaluators to solicit based on their availability, and their inferred ability to make helpful feedback for a particular Option-Subject pair. If the chosen Evaluator(s) are unresponsive, or if more data is needed after a response, the system may then solicit additional Evaluators. As with other recommendation systems, the present system stores the result of all previous Recommendations. The system may identify similarities between two users or two items through correlations, and use the similarities as evidence when making future Recommendations. To further aid an ongoing search, the system may ask the Subject for their first impressions of an item, and incorporate that information into the Recommendation, or to decide which Evaluator(s) to solicit for reviews.

By focusing on the Subject's needs and desires, rather than the usefulness of an item to a generic user, the present system has the potential to make more astute recommendations. It solicits reviews from the people most likely to influence the Recommendation, including the Subject's friends, knowledgeable experts, etc., to make the recommendation process personal, fun, and social. With this system, users will be able to help each other find exactly what they are looking for: anything from products, services, or entertainment, to a soulmate, a home, or personal advice.

Other features and advantages of the system will become apparent from the following more detailed description, taken in conjunction with the accompanying drawings, which illustrate, by way of example, the principles of the invention.

BRIEF DESCRIPTION OF THE DRAWINGS

FIG. 5 illustrates an example Client Interface where the recommended Option is another user.

FIG. 6 illustrates an example Client Interface where the recommended Option is a product.

DETAILED DESCRIPTION OF THE INVENTION

Figure 1:
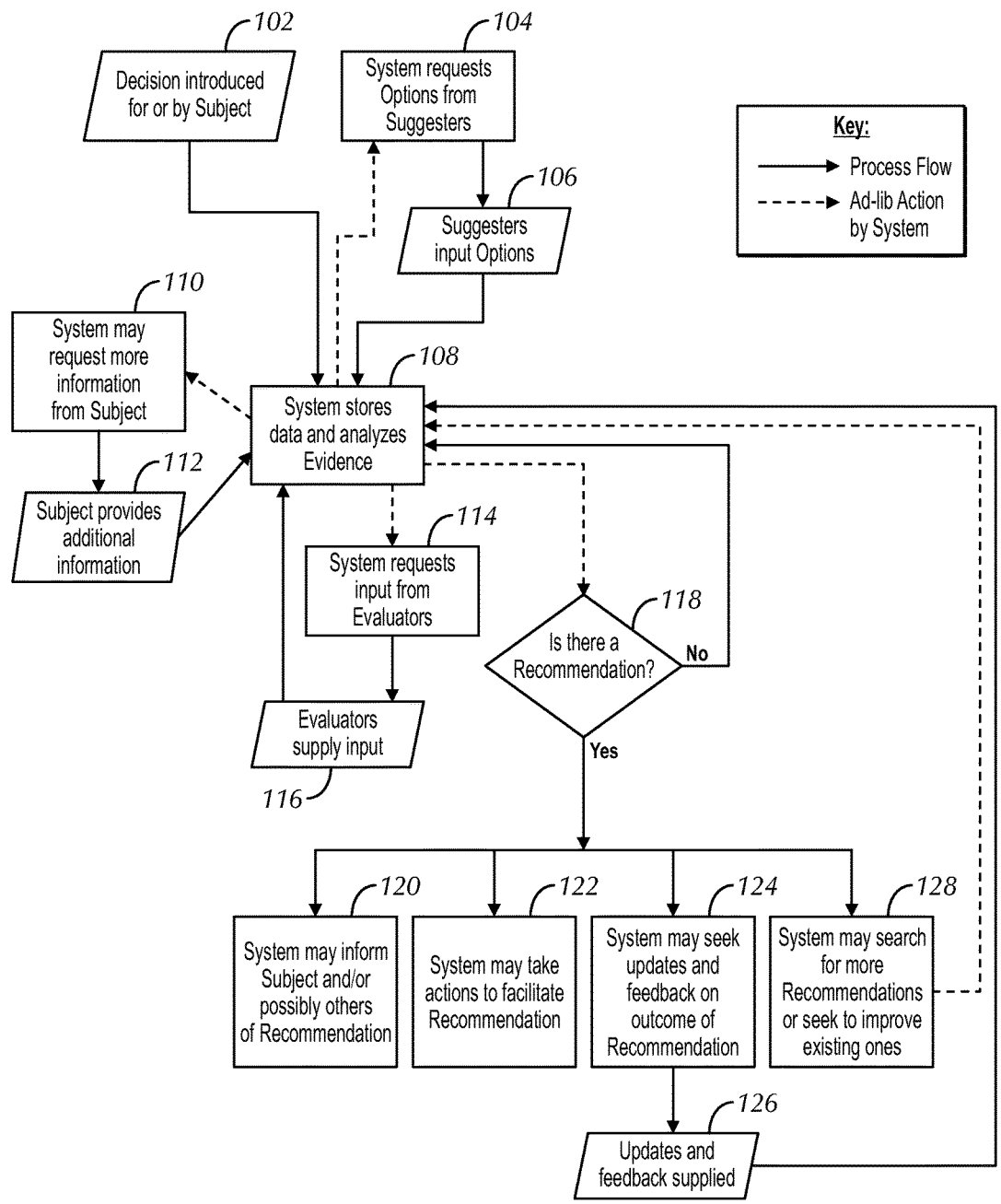
FIG. 1 illustrates the overall flow of events of an embodiment in which the three roles of Subject(s), Suggester(s), and Evaluator(s) contribute to a single Decision.

The following describes specific example embodiments of the present invention, with reference to the accompanying drawings wherein like numerals refer to like or corresponding elements throughout. This invention, however, may be embodied in many different ways, and the description and drawings related thereto should not be construed as limiting in any sense. Rather, the intention is to cover all modifications, equivalents, and alternatives falling within the spirit and scope of the present invention.

As will be appreciated by one skilled in the art, aspects of the present invention may be embodied as a system, method, device, or a computer program product. Accordingly, the present invention may take the form of an entirely software embodiment, or an embodiment that combines hardware and software aspects.

This document makes reference to multiple embodiments of the present invention. The phrases "in one embodiment," and "in an embodiment," as used herein do not necessarily refer to the same embodiment, although they may. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Some embodiments may use some or all of the following terminology. The meanings of these terms are not limited by the following definitions, and may be expanded or narrowed depending on the embodiment, as described throughout the document. The system is the collection of all software and hardware in an embodiment. A user is a person or entity that interacts with the system.

A Decision is anything that elicits a recommendation in regards to a subject, whether implicit or explicit; for example, a choice to be made, question to be answered, or juncture to navigate. An example of an implicit Decision on a website that sells books is: "Which book should I buy?" An Option is something, or a reference to something, that may satisfy a Decision. Examples include a product, service, activity, social issue, answer to a question, or user(s) as is common in social networking and online dating; in general, an Option may be anything that could satisfy a Decision for some Subject entity. Options may be represented by users, for example, a book for sale may be represented by a publisher. A user may be an Option, for example, in a social recommendation application; a user who is an Option may even be a Subject. Options may be defined separately from a Decision, in which case they are called standalone Options. An example of a standalone Option is a book that is listed for sale by a publisher—the book may never be associated to a Decision, or may be associated to a plurality of Decisions. A Decision may contain objective criteria on the types of Options that are allowed, such as age, price range, condition, etc.

A Recommendation is a proclamation by the system that an Option(s) is optimal in regards to a Decision. The determination of optimality may be made when a statistical analysis of the available Evidence supports the hypothesis within a certain confidence level. The system may require other conditions be satisfied before a Recommendation is issued; for example, the system may require that the Subject is active or the Option is available. The Recommendation may include a description of the Option(s), a summary of the reasoning and Evidence supporting the Recommendation, a mechanism that allows the user to interact with the Option, and a mechanism for the user to provide feedback about the Recommendation. The Recommendation is intended to be sent to the Subject; copies of the Recommendation may also be sent to other users, such as the Option or the user's Friends.

Evidence is any collection of facts, opinions, histories, and/or statistics, known to the system to affect a Decision. Evidence for a Decision includes evaluations for that Decision; prior user history of the Subject, Suggesters, and Evaluators for the Decision; outcomes of prior Decisions relating to the users and Options; prior evaluations of the Options from other Decisions; pertinent facts or opinions affecting the Decision from outside sources. Evidence may be updated at any time based on new information received, and may be used to influence any Decision made by the system: how to interpret a Decision, which Suggesters and Evaluators to solicit, what types of information to collect from Suggesters and Evaluators, how to interpret the responses from Suggesters and Evaluators, how to weigh evaluations from Evaluators, how to frame Evaluator's responses in formulating a Recommendation, etc.

A Subject is the target of a single Decision and the recipient of a Recommendation, on whose behalf suggestions and evaluations are performed. The Subject need not be a user. The Subject may be one or more persons or entities agreeing to be grouped together, and who intend to follow any Recommendation(s) as a group, such as a group of friends looking for a restaurant to dine at together.

A Suggester is a user or an algorithm entrusted by the system to generate Option(s), or associate a standalone Option to a Decision. Suggesters may be selected by the system based on factors including past success of their suggestions, their rate of making suggestions, and whether they are currently active. The Subject may also request particular Suggesters, or choose to exclude entities as Suggesters. In some embodiments, users may volunteer to make suggestions. Depending on the embodiment, Suggesters may only suggest Options to Subjects pre-approved by the system or Subject. Suggesters who are also Subjects may be allowed to suggest Options to their own Decisions. Suggesters who are also Evaluators may be allowed to suggest new Options during their evaluation process. In one embodiment, the system contacts the Suggester immediately when Options are needed. In another embodiment, the Suggester may browse or search Decisions and suggest Options for some. In some embodiments, the Subject may see the identity of the Suggester who suggested an Option; in other embodiments, the role may be anonymous. The server may employ automated Suggester algorithms, either internal or external to the system, that search a database of standalone Options, for example. Suggesters may also be, for example, companies that recommend their products or services, possibly taking into account user demographics.

An Evaluator is a user or algorithm entrusted by the system to provide fact(s), opinion(s), or endorsement(s) of an Option(s) proposes in response to a Decision. An evaluation is any collection of facts and/or opinions from an Evaluator regarding an Option(s) for a particular Subject and Decision. Some embodiments may allow free-form or open-ended responses. The system may inquire about the Options themselves. The system may inquire about how well the Option suits the Subject, or vice versa. The system may inquire about the Subject, or for clarification about the Subject's Decision. The system may issue one or many inquires at a time. The Evaluator may choose to answer some or all of the questions. The type of input that the Evaluator supplies depends on the embodiment. An Evaluator may be asked to endorse an Option, or vouch for a statement made concerning an Option. In another embodiment, an Evaluator may be asked to provide a numerical rating for an Option. In some embodiments, an Evaluator may also be permitted to interact with Options in other ways. For example, if the Option is a product, the Evaluator may be allowed to purchase the product. Or, the Evaluator may be allowed to recommend an Option from one Decision to another.

Users may specify a Friend Set of other people with whom they wish to interact. Friends are two users who both agree to interact with one another. In some embodiments, a Friend of a Subject is by default an Evaluator and Suggester for that Subject. In other embodiments, the assignment of roles among friends is determined by the Subject, other users, and/or the system. In the preferred embodiment, a Friend Set is a set of persons, parties, entities, or algorithms, specified by a user and/or the system, who may be allowed to contribute to the recommendation process for a given Subject. For each person, the system may ask for details about the user's relationships with that person. Specified people who are not currently users of the application may be solicited to enroll, or the system may contact them outside of the application.

In some embodiments, the Subject or system may make changes to the Friend Set at any time; this ability may be embedded seamlessly into any aspect of the user interface. In one embodiment, the user may choose the entire set of registered users. In another embodiment, the user may be limited to a certain number in the Friend Set. This limit may be variable from user to user, and may depend on the user's chosen role(s), the user's activity on the application, the user's popularity, a fee charged by the application, or for any other reason. In some embodiments, the user may have multiple Friend Sets, nonexclusive, and the system may enforce different rules for each Friend Set. In some embodiments, the contents of the Friend Set may not be shown to the Subject or may only be partially shown to the Subject. The system may allow people outside of the Friend Set to contribute to the recommendation process.

FIG. 1 shows a flowchart of the events contributing to a single Recommendation. The process may be carried out in parallel: actions and flows may occur simultaneously. Processes may continue even if a user or agent does not respond, as may any ad lib action by the system, such as soliciting a new suggestion, soliciting a new evaluation, or making a Recommendation.

First, the system acknowledges a Decision to be processed 102; if the Decision is inputted explicitly by a user, the system may collect Options from the user (not shown). The system then begins a cyclical pattern of analyzing the Evidence and responding as according to the analysis 108; more than one server response may occur simultaneously in parallel. One system response is that the system may request more information from the Subject 110 or an entity familiar with the Subject; the response is stored 112, and may be considered additional Evidence or search criteria for Options.

Another system response is to gather 104 and store 106 Options from Suggesters, who may be chosen by the system specifically based on Evidence and the Suggester's responsiveness, may be chosen by the Subject, or may volunteer. Another response is to gather 114 and store 116 evaluations from Evaluators, who may be chosen by the system specifically to evaluate a particular Option based on Evidence and the Evaluator's responsiveness, may be chosen by the Subject, or may volunteer. Another response by the system is to arrive at a determination that a Recommendation should be made 118, for example, after determining that one Option has a high probability of being the best Option.

If the system determines the Evidence supports the Recommendation of an Option(s), it may inform the Subject and/or possibly others, including Suggesters, Evaluators, and/or members of the Subject's Friend Set, of the Recommendation 120. It may also take steps to facilitate the Recommendation 122; for example: by forwarding a link to purchase, making an introduction, or and additional means, some of which are described in further examples below. The system may also continue to gather evaluations of the Options from Evaluators even after the Recommendation is made, to improve the quality of the Recommendation, or to gather Evidence for other (possibly future) Recommendations. The system may also seek updates and feedback on the outcome of the Recommendation 124; if these updates and feedback are provided, they may be considered additional Evidence 126. The system may also search for more Recommendations or seek to improve existing ones, in which case the outcome of the present Recommendation may be treated as additional Evidence 128.

The system may continue to analyze and collect Evidence 108 after issuing a Recommendation 118. Some Decisions may be ongoing in nature, such as "which book should I read next?" In those cases, the system may continue to issue further Recommendations until the Subject is satisfied with the Recommendation(s) received. In some embodiments, the system may show the Subject the progress of the analysis 108, including the leading Options, the gathered evaluations, and any ranking or scoring of the Options performed by the system.

Figure 2:
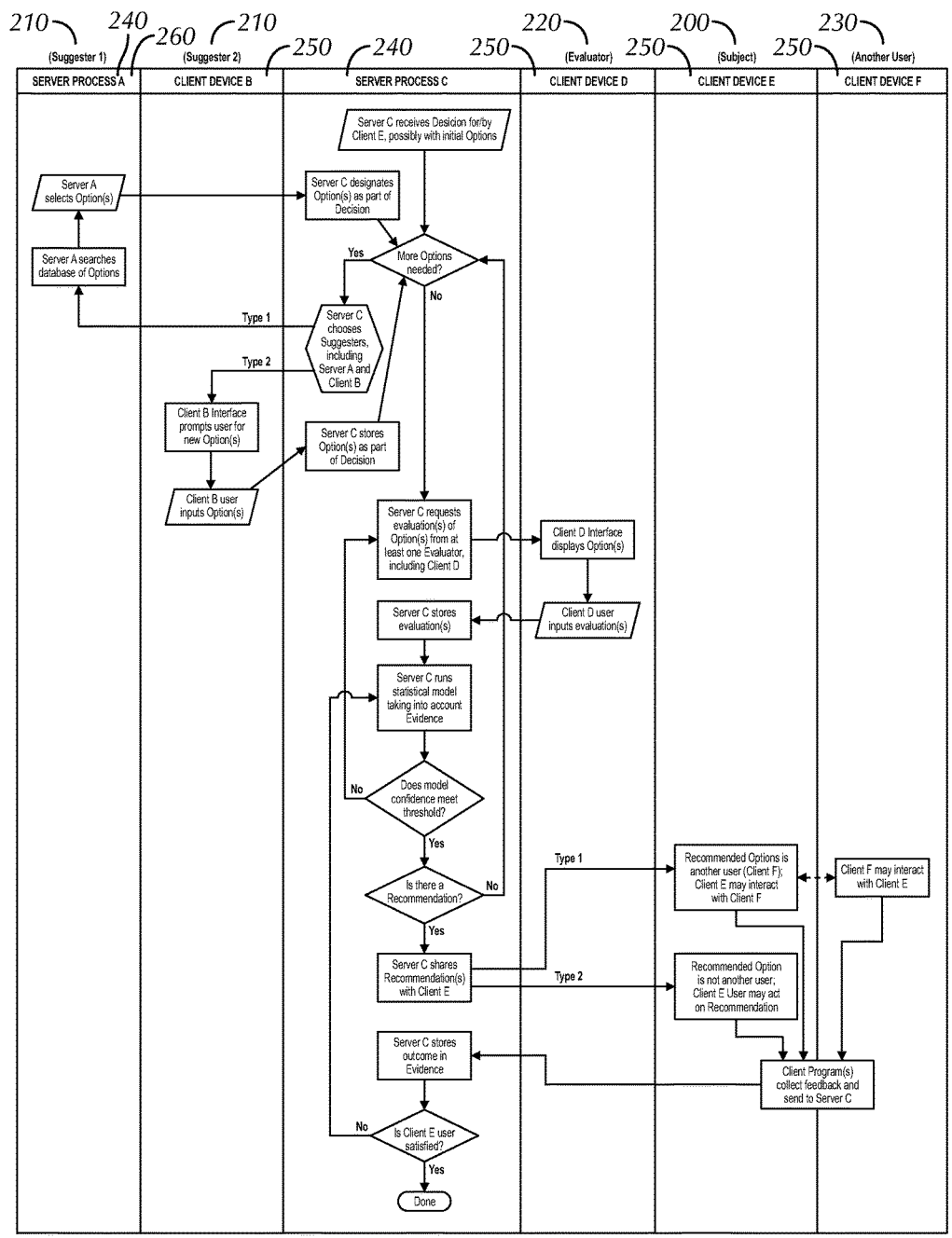
FIG. 2 illustrates the overall flow of events being carried out within the server and any connected client devices, and demonstrates which steps are assigned to the users carrying out the roles of Subject, Suggester, and Evaluator.

As illustrated in FIG. 2, the flow of events as described in FIG. 1 may be distributed between a host server 240 and one or more client devices 250 employed by users serving the roles of Subject 200, Suggester 210, and Evaluator 220.

FIG. 2 shows the main processes involved in a single hypothetical Decision, starting from the top and following the arrows to the bottom, divided into columns by device. The process begins when Server Process C 240 acknowledges a Decision for the Subject interacting via Client Device E. For example, the Subject may explicitly enter the Decision, enter criteria for Options, and may possibly suggest some initial Options. The Subject may specify preferred users to serve as Evaluator or Suggester (not shown). Before proceeding, Server Process C determines whether there are enough acceptable Options based on a precursory review of available Evidence; for example, a certain embodiment may require two plausible Options.

If more Options are needed, Server C chooses Suggesters from among the ones available. In this example there are two Suggesters, one an algorithm and the other a user. If the Suggester is an algorithm (Type 1), Server Process C may initiate another thread, here Server Process A, to search the database of Options for ones that satisfy the Decision. When Server Process A is complete, it returns the results to Server Process C, which designates those Options as part of the Decision. If the Suggester is a user (Type 2), Server Process C sends a request to the user's device, here Client Device B, which prompts the user to input Options, or select from pre-existing Options. Client Device B relays the inputs to Server Process C, which designates the Options as part of the Decision, and creates a new Option entry for each new Option. Server Process C eliminates any Options that either do not fit the Decision criteria, or that can be definitively eliminated from a precursory analysis of the Evidence.

Server Process C continues to solicit Options until enough are found. Then, Server C requests evaluations of the Option(s) from at least one Evaluator, here Client D. Server C may choose specific Evaluators for specific Options based on the Evaluators' familiarity with the Option(s), or based on Evaluator scores. When an evaluation is requested, the Evaluator's device displays the Option and the evaluation mechanism, such as a slider or text input box. Client Device D then sends the evaluation data to Server Process C, which stores the evaluations in a database. After receiving one or more evaluations, Server Process C again runs the statistical model, updating the Evidence in response to the new evaluation(s). If the statistical model cannot confidently make a determination, Server C uses the model's output to solicit more evaluations with the goal of increasing the statistical confidence where it is most needed.

If the statistical model can confidently eliminate all possibilities given the Options, Server C goes back to soliciting suggestions for more Options. If, however, the statistical model can confidently support an Option(s) in answer to the Decision, it proceeds to make a Recommendation. If the Recommendation is a social Match with another user (Type 1), in this example user F, the system opens a line of communication between the Matched users. If the Recommendation is an Option(s) that is not another user (Type 2), the Recommendation may contain a mechanism to act on the Recommendation, such as a purchase button. In either case, the participating Client Programs communicate the outcome of the Recommendation to Server Process C, which may include data indicating whether the Subject acted upon the Recommendation and whether the Subject was satisfied. Server Process C stores this feedback in memory, and updates the Evidence. Memory is any store of data, including databases, hard drives, and RAM. If the Subject was not satisfied, Server Process C may re-run the statistical model incorporating the new Evidence, and may proceed to solicit suggestions for new Options and new evaluations.

Additionally, in one embodiment of the system, one or more of the roles of Subject 200, Suggester 210, and Evaluator 220 may be carried out by the host server 240 or a third party server 260. Server Process A in the flowchart is an example of the host server 240 third party server 240 carrying out the role of Suggester 210 as an automated process, with Options being suggested from a database of Options on the server.

In one embodiment of the system, a user's profile may be suggested as an Option 230 for a Decision. In this embodiment, the user who becomes a Recommended Option 230 in a Decision may be notified of the Recommendation or placed in communication with the user who serves as the Subject 200 of the Decision, in which case the client device 250 of the user recommended as an Option is also involved in the system.

In a preferred embodiment the processing is carried out via interactions between a Server side and a Client side. The Server side is made up of a Server Memory 300 and Server Program 320, while the Client side is made up of a Client Memory 400, Client Program 420, and Client Interface 460. The system comprises at least one instance of the Server Memory and Server Program. Each end-user is associated with at least one instance of the Client Memory, Client Program, and Client Interface. For simplicity, the following descriptions assume one instance of a Client Program for each user, such as a smartphone application or webpage, and one instance of the Server Program running on a centralized Server.

In some embodiments, these functionalities may be fragmented over multiple instances running on multiple computer devices running in parallel, or be run on as few as one computer. For convenience, the following describes an embodiment in which the Server Memory and Client Memory are divided up into specialized named databases (to be described in the following sections). Most of the named databases in the Server Memory have corresponding named databases in the Client Memory. Unless otherwise stated, the Client Memory is a subset of the Server Memory, of entries that are pertinent to that particular user. These databases are intended to be synced continually by the Client Program and Server Program running in the background, as detailed below.

The preferred embodiment utilizes the Distributed Data Protocol, a system for handling database synchronization and communication, across a WebSocket duplex transport, with a SockJS WebSocket emulator as fallback. Each Client Program may issue "subscribe" directives to the Server Program for database queries needed to display the Client Interface. In turn, if the Server Program determines that the user has access to the requested entries, it "publishes" the entries to the proper Client Program. Unless otherwise noted, the Server Program keeps a record of the subscriptions in memory; when changes are made to the Server Memory that affect the subscription query, the Server Program sends the affected Client a list of "added", "changed" and "removed" commands that instruct the Client Program to add entries, change entries, or remove entries from the Client Memory, respectively.

Once the Client Program determines that it no longer needs a subscription to certain data, it may send a message to the Server Program to stop the subscription. For example, after an Evaluator submits an evaluation for an Option, the Client Program stops the subscription for any data pertaining to that Option; the Client Program may re-subscribe to the data if it is needed later in a different context, such as if the Subject embeds the Option into a chat message. The Server Program also stops subscriptions when the user logs off or the WebSocket closes due to inactivity. The Server Program may publish data not explicitly requested by the Client Program if it anticipates the Client needing the data. For example, when the Server Program makes changes to a user's Serve Queue, Recommendations, or Decisions database entries, it automatically subscribes the Client Program to any referenced Options entries in order to avoid an unnecessary server-client round trip.

Figure 3:
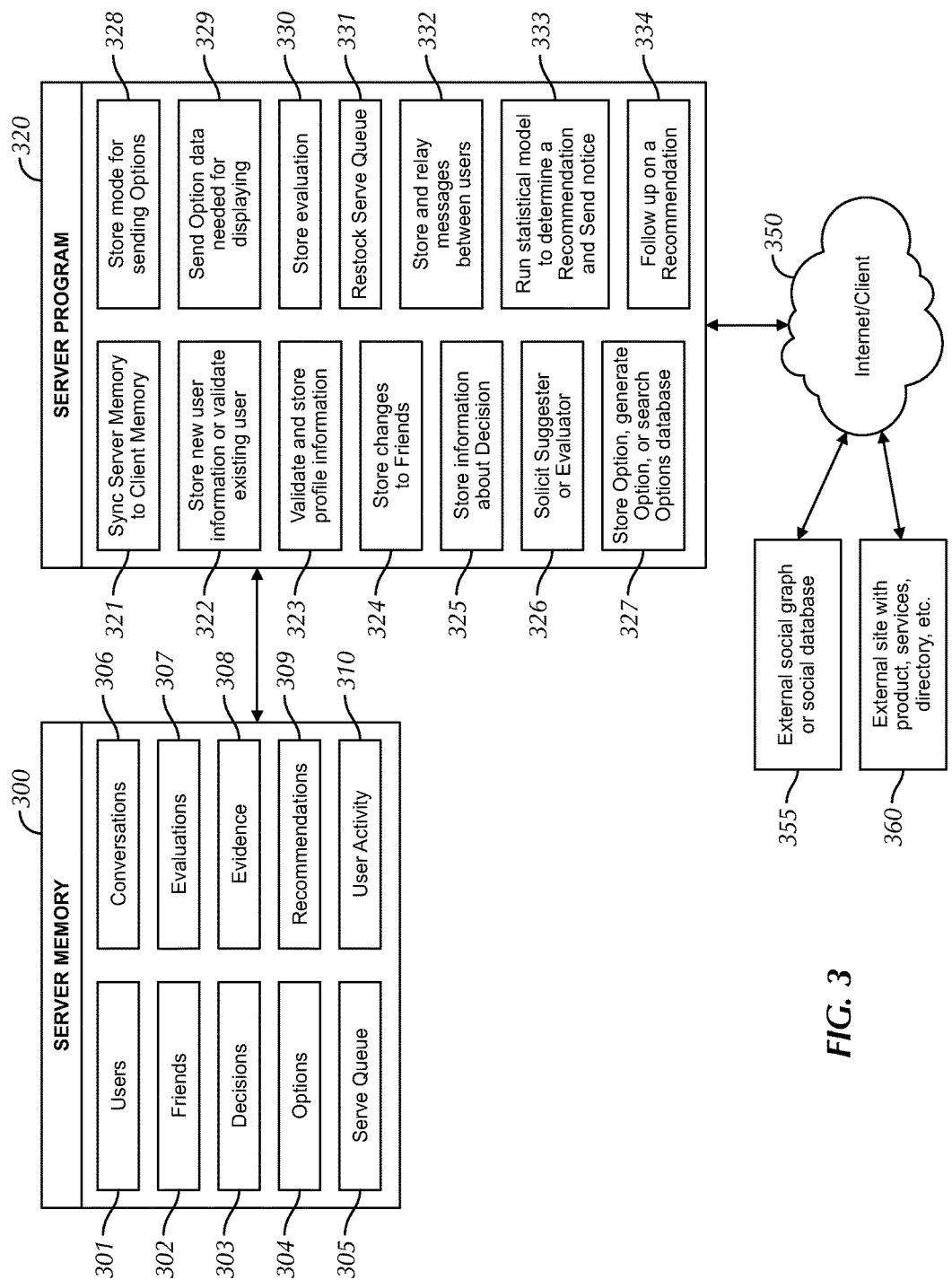
FIG. 3 illustrates the layout of the server side of an embodiment of the system divided between a host server and one or more client devices.
Figure 4:
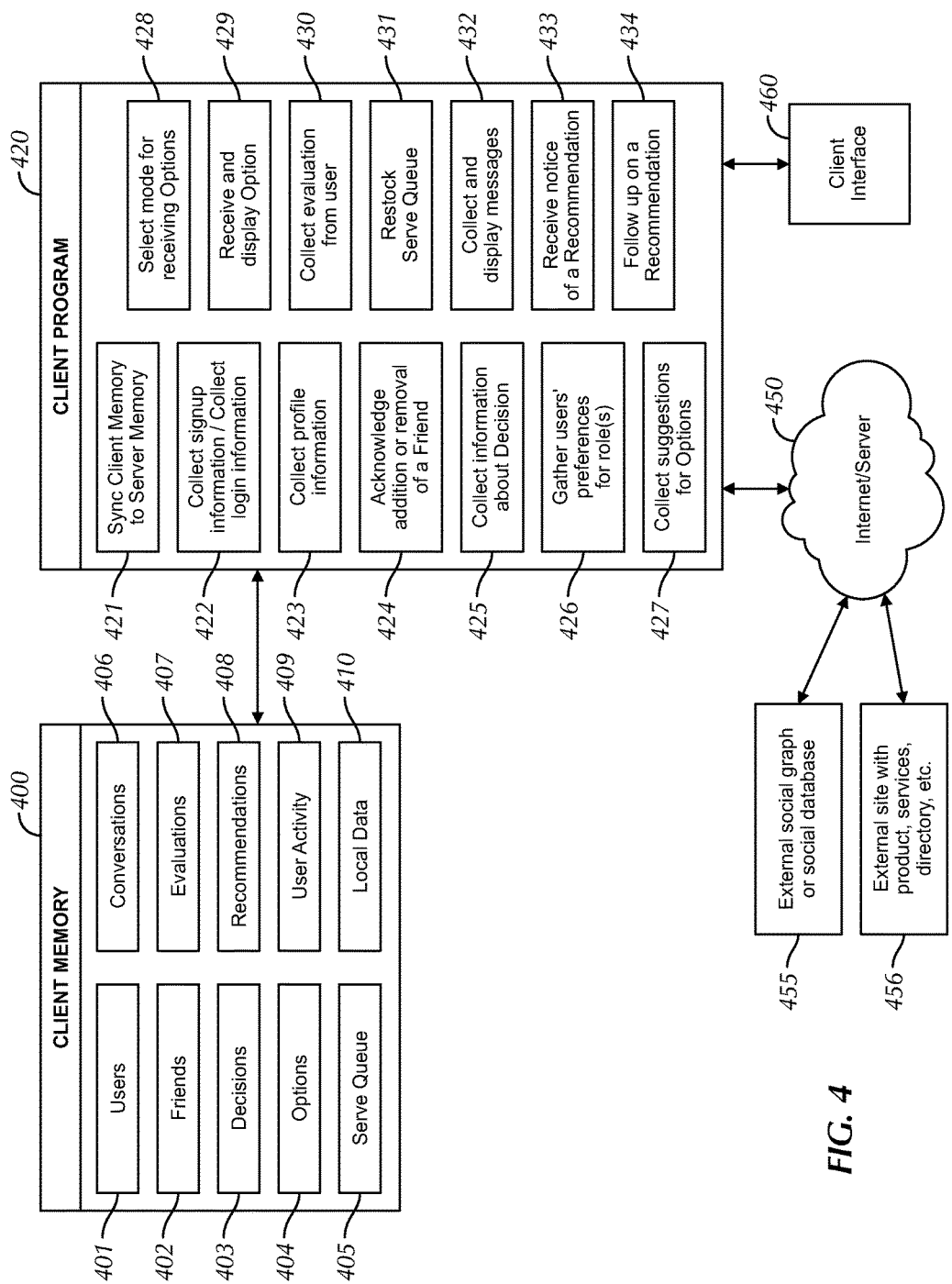
FIG. 4 illustrates the layout of the client side of an embodiment of the system divided between a host server and one or more client devices.

FIG. 3 shows an example layout of the Server side of the preferred embodiment, while FIG. 4 shows an example layout of the Client side.

The Server side is made up of a Server Memory 300, a Server Program 320, and an Internet connection or other connection 350 to one or more client instances. The server side may also optionally be connected via the Internet 350 to one or more external Social Graphs or Social Databases 355 (such as one belonging to an existing social networking site), or to External sites with Product Services, Directories, etc. 360.

The Server Memory 300 serves as a central database for the system. It includes user information 301 which may include each user's name, photos, and private identifying information such as User ID, password, and identifying information from social networks. In embodiments containing Friend relationships, the Server Memory 300 stores data relating to Friends 302 identified by the user and optionally roles the Friends have served in the decision-making process.

The Server Memory 300 may store data relating to Decisions 303 created by users for which a Recommendation is requested. Stored information about Decisions 303 may include the User ID of the Subject proposing the Decision, the Options ID of each suggested Option, the Evaluation ID of each Evaluation, and a link to any issued Recommendation. For each Decision, there may also be an attached list of basic filtering criteria, such as price range or age range.

The Server Memory may store data relating to Options 304 suggested in response to Decisions, with the Option being identified by a unique Option ID (which may correspond to User ID in Matching applications). Some of the data may be searchable. Depending on the Decision being discussed, Options could be searched by color, price, or age. Other data may be more detailed information to be sent to Evaluators to enable them to make informed evaluations, such as a detailed description, location, or previous reviews. This data may have been pooled from a plurality of sources, and may include photos or hyperlinks to photos. If the Option is a human, then the information may be biographical. In some embodiments, the Server Program 320 may share Options between multiple Decisions; in other embodiments, the Options may be exclusive to a single Decision.

The Server Memory 300 may store data relating to a Serve Queue 305, a feature used in some embodiments to ensure that Evaluators receive a steady stream of Options to evaluate. A Serve Queue is created for each Evaluator consisting of a list of Options for each of the Evaluator's Decisions, that the system intends to send the Evaluator for evaluation. Each element in the list at minimum consists of an Option ID and the User ID for the associated Subject. The Serve Queue system is for optimization and is not strictly necessary.

In embodiments containing a conversation feature between users, the Server Memory 300 may store data relating to conversations 306. For each conversation between users of the application, a database entry consists of the User IDs, a list of messages, message timestamps, etc. This database is only necessary in embodiments with a conversation feature.

The Server Memory 300 may store data relating to evaluations 307. Data stored may include the Evaluator who proposed it (User ID), the Option being evaluated (Option ID), the Subject for whom the rating is tailored (User ID), and the data representing the rating and/or evaluation. Each evaluation may be referenced by a unique Evaluation ID.

The Server Memory 300 may have a separate database for data and metadata relating to Evidence 308, such as statistics on previous evaluations, as well as the outcomes of past Recommendations. This data is used to determine parameters for the statistical model, which in turn are used to weight evaluations and determine which Options are chosen to be Recommendations. This information may consist of all prior evaluations, prior Recommendations, and the outcomes of the Recommendations, as well as external data sources. Data contained in this database may be duplicated elsewhere, in which case this database not is not required. This database is only necessary in embodiments that employ user-history-based algorithms. In a preferred embodiment, this database contains an entry for each Decision, with sub-entries containing the Option score for each Option considered, the Suggester score for each Suggester, the Evaluator score for each Evaluator (for scores, see 333), and the outcomes of any Recommendations (see 334).

The Server Memory 300 may store data relating to Recommendations 309. This data may include a history of all Recommendations served by the system, identified by a unique Recommendation ID. This includes links to the Subject (User ID), the Option (Option ID), evaluations (Evaluation ID), as well as a timestamp, whether the Recommendation has been viewed, etc. It also may include any follow-up information such as whether the Recommendation was acted upon, and whether it proved to be successful.

The Server Memory 300 may store data relating to user activity 310. This data may include, for each user, a summary of their recent and past usage of the application. This data may be shown publicly—such as the approximate time since the user last used the application—or privately—such as usage behavior to be used for fine-tuning the user experience. This database is not strictly necessary.

The Server Program 320 has several functions. First, in communication with the Client Program 420 (FIG. 4), the Server Program 320 serves to sync Server Memory to Client Memory 321. These databases are intended to be synced periodically by the Client Program 420 and Server Program 320 running in the background. When the Client Program 420 updates the Client Memory, it also transmits the changes via the Internet or other client-server connection 350 to the Server Program 320, which validates the changes, and stores the results in the Server Memory 300. When the Server Program 320 makes changes to the Server Memory 300, it also identifies which users should receive copies of that data, and transmits the changes via the Internet or other client-server connection 350 to the associated Client Programs 420 of those users, which then update their Client Memory 400 (FIG. 4) databases accordingly. In rare instances where a clash occurs, the Client Program 420 and Server Program 320 use an algorithm to determine which data has precedence. In such a way, the various Client Devices may communicate via the Server acting as a go-between. Other embodiments may use different methods to handle the data storage, updating, or communication.

Another function of the Server Program 320 is to store new user information and validate existing user information 322. After running the Client Program 420 on a device, the user must register an account or login. The Client Program 420 prompts the user for identifying information and validates the user. For example, the Client Program 420 may utilize an external social network site to verify that the user's information is authentic. In such case, the user is prompted to enter their login information into the social network portal. The Client Program 420 collects the social network ID, and a verification token. The Client Program 420 stores this information locally in a new entry in the Client Memory Users database 401 (FIG. 4) in the Client Memory 400 and also transmits the information through the Internet 350 to the Server Program 320. If the user already exists in the Server Memory 300 Users database 301, then the user is regarded as an existing user; otherwise, the Server Program 320 stores the information as a new entry and assigns the user a unique User ID. The Server Program 320 may communicate with external social networks to verify or fill in information provided by the user. The Server Program 320 then syncs the Client Memory to match the pertinent entry in the Server Memory 321.

Another function of the Server Program 320 is to validate and store profile information 323. In some embodiments, the system may contain a profile of each user. Portions of the profile may be public to some or all users; other portions may be used by the Server Program 320 to make Recommendations. In some embodiments, the user may at any time click on a button on the Client Interface 460 (FIG. 4) to edit their profile information. In some embodiments, Friends may also be able to add information to their Friends' profiles. The Client Program 420 may also initiate this Function for a new user immediately after registering the user for the first time. The Client Program 420 displays a page of input controls that the user may interact with. In some embodiments for example, the user may be able to set a headshot image. The user may click on a button of their headshot. The Client Program 420 may then download photos of the user from an external social network, display them to the user, prompt the user to select one, and finally prompt the user to zoom and crop the photo. The resulting image is placed in the Client Memory Users database 401, and uploaded via the Internet 350 or other connection to the Server Program 320, which then syncs the user's entry in the Server Memory 321.

Another function of the Server Program 320 is to store changes to Friends 324 as when the user manages their Friend connections. The Client Interface 460 may display a designated button to initiate adding a Friend, or the Client Program 420 may initiate the function as part of the initial registration process. In either case, the Client Program 420 may display a dedicated page on the Client Interface 460 for managing Friends. In one embodiment, the Client Program 420 displays a list of the user's Friends from the Friends database 402 (FIG. 4), and displays the corresponding profiles' information from the Users database 401 (FIG. 4). Next to each displayed Friend, a "remove" button is shown.

Below that list, the Client Program 420 uses information from an external social network 355 to make a list of people associated with the user. The Client Program displays an "add" button next to each person. If the user clicks a "remove" button, the Client Program 420 removes that Friend from the Client Memory Friends store 402, and sends a message via the Internet 350 that causes the Server Program 320 to do likewise with the Server Memory Friends store 302. If the user clicks an "add" button, the Client Program 420 adds the associated person to the Client Memory Friends database 402 with a "requested" flag. The Client Program 420 relays this information to the Server Program 320 via the Internet 350, identifying the selected associated person by means of the social network identifier for that person.

The Server Program 320 cross-references the unique identifier of the selected person with the Server Memory Users database 301 to positively identify the selected person as a user of the application. The Server Program 320 enters the Friend request into the Server Memory 300. The next time the requested person's device syncs with the Server, his or her Client Program 420 will register the Friend request, and prompt the person to approve or deny the Friendship. If approved, the requested person's Client Program 420 relays the approval to the Server, which marks the entry as "approved" in the Friends database 302. The next time the original user's device syncs with the Server, the Client Program 420 will register that the other person has approved the relationship. The two users are henceforth Friends on the application.

Another function of the Server Program 320 is to store information about Decisions 325. The Client Interface 460 contains a button that begins a process for the user to add a new Decision. In some embodiments, the Decision is implied by the nature of the application, and the button is simply a toggle that opts the user into the Decision, and implicitly designates the user to be the Subject of said Decision. In more general embodiments, the Client Program 420 may prompt the user for the nature of the Decision, the Subject of the Decision, some initial Options, details about the Options, criteria for Options, etc. In some embodiments, certain users, such as the user's Friends, may be able to amend or edit the aforementioned properties and roles of the Decision via a screen on the Client Interface 460. In some embodiments, these roles may be implied rather than clearly stated; for example, the roles may be performed by the Server Program 320 or the user's Friends. The Client Program 420 uses this information to either add a new entry to Client Memory Decisions database 403 or edit an existing entry, if applicable. The Client Program 420 then transmits this information to the Server Program 320, which syncs the information into the Server Memory Decisions database 303.

Another function of the Server Program 320 is to store information about Decisions 325. The Client Interface 460 may contain a button that begins a process for the user to add a new Decision. In some embodiments, the Decision is implied by the nature of the application, and the button is simply a toggle that opts the user into the Decision, and implicitly designates the user to be the Subject of said Decision; in some embodiments, every user is a Subject by default. In some embodiments, the Client Program 400 may prompt the user for the nature of the Decision, the Subject of the Decision, some initial Options, details about the Options, criteria for Options, etc. In some embodiments, certain users, such as the user's Friends, may be able to amend or edit the aforementioned properties and roles of the Decision via a screen on the Client Interface 460.

In some embodiments, these roles may be implied rather than clearly stated; for example, the roles may be performed by the Server Program 320 or the user's Friends. The Client Program 420 uses this information to either add a new entry to Client Memory Decisions database 403 or edit an existing entry, if applicable. The Client Program 420 then transmits this information to the Server Program 320, which syncs the information into the Server Memory Decisions database 303. In some embodiments, the Server Program 420 selects Subjects and creates Decisions by algorithm. In any case, the particulars of each Decision are stored in the Server Memory Decisions database 303 along with the identity of the Subject.

Another function of the Server Program 320 in some embodiments is to solicit a suggestion or evaluation from a Suggester or Evaluator, respectively 326. Prior to this step, a pool of Suggesters and Evaluators is determined by user preferences (see 426). In the preferred embodiment, from within the pool of available Suggesters, the Server Program 320 solicits specific Suggesters for a specific Decision based on factors including: a history of suggesting Options that receive high ratings from the Subject or that result in good outcomes after Recommendation (factors expressed in the Suggester score); availability and responsiveness of the user; familiarity with the Subject or Decision; or needing more data to hone the Suggester score. Similarly, in the preferred embodiment, from within the pool of available Evaluators, the Server Program 320 solicits specific Evaluators for specific Options based on factors including: a history of accurately predicting the Subject's ratings, or the success of Options in Recommendations (factors expressed in the Evaluator score); availability and responsiveness of the user; familiarity with the Subject or Decision; or needing more data to hone the Evaluator score. When a solicitation is made, it is sent as a message from the Server Program to the Client Program to appear as an instant notification, or as a message on a dedicated suggesting screen, on the client device (see 427). Or, in some embodiments, a solicitation for evaluation is added to the user's Serve Queue (see 331).

Another function of the Server Program 320 is to manage the server-side aspects of suggesting 327: store an Option, generate an Option, or search the Options database 304, depending on the source of the Options. First, they may come from Suggesters suggesting an Option for a particular Decision. Second, they may come from users suggesting Options without a particular Decision or Subject in mind (standalone Options). Third, in some embodiments involving social matching, Subjects may opt into being an Option also, at which point a flag is created that may be stored Users database 301. Fourth, in some embodiments, Options may be generated by algorithms 327 run by the Server Program 320 or other program.

Fifth, the Server Program may search 327 the Options database 304 for standalone Options satisfying the criteria of a Decision. In any case, the Server Program 320 may format the Option or retrieve more data about the Option from users or sources. It then inserts this information as a new entry, or updates an existing entry if applicable, in the Server Memory Options database 304, and may store references (Option IDs) in the Decisions database 303 in the entry for the Decision. The Server Program 320 may store the identity of the Suggester in the Option entry 304, in the case of a standalone Option, or in the Decision entry 303, otherwise. This information is then synced with the appropriate entries from the Client Memory Options database 404. A reference to the Option is added to the Server Memory Decisions database 303. Meanwhile, the Client Program 420 may ask the user to provide an immediate evaluation of the new Option, following the aforementioned protocol. Otherwise, the application returns control to the user and operation proceeds as usual.

Another function of the Server Program 320, in embodiments with multiple evaluation modes, is to handle switching between various modes. Depending on the embodiment, a user who is an Evaluator may evaluate Options in sequence—where one evaluation is solicited at a time—or in parallel—where the Evaluator may see a plurality of Options on the same screen. In the parallel case, the Evaluator may choose one of the displayed Options to evaluate; or, the Evaluator may select a set of Options and choose to apply an evaluation to the entire set. In the sequential case, the selection of which Option(s) to show and Evaluate next may be determined by an ordering chosen by the user, by the Server Program 320, by the Client Program 420, or by some combination of the above. In some embodiments, the user may select a Decision from a list of available Decisions on the Client Interface 460, then the Client Program 420 chooses corresponding Options from the Client Memory Serve Queue 405.

In another embodiment, the Decision may be implied, in which case the user selects the associated Subject from a list on the Client Interface 460, and the Client Program chooses corresponding Options from the Client Memory Serve Queue 305. In another embodiment, the user may select from a list of all Options in the Client Memory Serve Queue 305. In another embodiment, the Client Program 420 may choose Options at random from the Client Memory Serve Queue 405. In any case, one or more Options is selected from the Serve Queue 405, or in other embodiments, directly from the Client Memory Options database 404.

Another function of the Server Program 320 is to send Option data needed for display 329 by a client device. The Server Program may send this data in response to a direct request from a Client Program 429, or preemptively when the Server restocks the Serve Queue of an active Evaluator 331. In addition to raw data from the Options database 304, the Server program may send other processed data. In some embodiments, the Server Program computes in real-time the distance between the Option and the Subject, or the Subject's last known position. In some embodiments, the Server Program redacts or obfuscates any personal information about the Option. In some embodiments, the Server Program also sends prior ratings from the Evaluations database 307; the ratings may be used to populate the indicators on a slider bar 520, 620. Other embodiments may transfer other related data.

Another function of the Server Program 320 is to store evaluations 330 received from the Client Program 420. Using the input mechanism displayed with the Option(s) in the Client Interface 460, the user inputs an evaluation. The input mechanism may take many forms; for example, in one embodiment, the user rates the Option on a sliding scale. In some embodiments, the user may be able to click a button to opt out of providing an evaluation altogether. In any case, the Client Program 420 registers the result in the Client Memory Evaluations database 407. The Client Program 420 then relays the result via the Internet 350 to the Server Program 320, which enters the data into the Server Memory Evaluations database 307.

In some embodiments where Options are displayed sequentially, the Client Program 420 may then replace the displayed Option with the next Option from the Client Memory Serve Queue 405, or prompt the user to select another Decision. In most cases, once an Option is evaluated, the Client Program removes the Option from the Client Memory Serve Queue 405 for the associated Decision. Likewise, once the Server Program 320 receives the evaluation data via the Internet 350 from the Client Program 420 and determines it has enough information from the Evaluator, the Server Program 320 removes the Option from the Server Memory Serve Queue 305 for the associated user and and Decision. So, the Evaluator will not receive repeated requests to evaluate the same Option, unless the Server Program 320 determines at a later time that more information is needed.

Another function of the Server Program 320 is to restock a Serve Queue 331. In a preferred embodiment, an Evaluator always has an Option available to evaluate in order to keep the user engaged. The Client Program 420 syncs the Client Serve Queue database 405 to the Server version 305 so that the Evaluator has Options available to evaluate. The Server Program 320 tries to make sure that each Evaluator has an adequate number of Options listed in the user's Serve Queue, including ideally some for each Decision or Subject. If restocking is anticipated to be needed, the Server Program attempts to solicit a Suggester 326, generate an Option by algorithm 327, or search for suitable standalone Options 327. The Server Program 320 may also add Options to the Serve Queue as part of its previously described function of soliciting an Evaluator 326.

Another function of the Server Program 320 is to store and relay messages between users 332. In some embodiments, users may engage with other users via a chat feature, which may be text-, audio-, or video-based. In embodiments with Friends, confirmed Friends are able to chat with each other by default. In embodiments where Options are users, users may be able to chat with recommended users. The Client Program 420 will at times display a button 560, 660 that takes the user to a messaging page, similar to existing messaging applications, except that the contacts may be organized or structured based on their role(s) with respect to the user on the application. For example, Friends may be displayed with a different background color than recommended users. Another novel feature is that the application facilitates chats between Friends on the topic of particular evaluations or Options.

In one embodiment, when the Client Program 420 displays an Option for the user to evaluate, it also displays the prior evaluations of that Option from the user's Friends. When a user clicks on one of the Friend's evaluations—shown for example on the evaluation screen, the list of Recommended users, or the edit-Decision screen—the Client Program 420 initiates a chat between the user and the Friend. The Client Program 420 may embed into the chat a summary of the Option and the Friend's prior evaluation. In this way, the user and the Friend can easily discuss the Option and reasoning behind the Friend's evaluation. Whether the conversation was initiated through the chat button or by clicking on a Friend evaluation, the Client Program 420 populates the chat display with the previous messages from the Client Memory Conversations database 406. When the user enters a message, the Client Program 420 digitizes the message, stores it into the Client Memory Conversations database 406. In the background, the Client Program and the Server Program sync their respective Conversations databases via the Internet 321, 332, at frequent intervals. In this way, messages are routed between users via the Server Program 320.

Another function of the Server Program 320 is to run a statistical model to determine a Recommendation(s), and send notice 333 to the Subject. In the background, the Server program 320 may at times run a statistical model based on available Evidence. Some model calculations may be re-computed in response to receiving new input from users. The calculations, or portions thereof, may also be performed by a Client Program 420 in some embodiments. For a given Decision, the inputs to the statistical model may include: each evaluation of an Option for the Decision; each evaluation made by an Evaluator of this Decision for a prior Decision; the outcome of each prior Decisions involving the Subject, a Suggester, or an Evaluator; correlations between ratings made by each pair of Evaluators, including the Subject if applicable, for this Decision and prior Decisions; evaluations of similar Options by third parties; the outcomes of similar Options in third parties' Recommendations.

As an intermediate step, for each of the aforementioned inputs, the statistical model may assign numerical values to components that encapsulate their relative importance and associated certainty. The Server Program 320 may store these values in the Server Memory Evidence 308 database to avoid unnecessary recomputation of the values. Examples of these values include Suggester scores and Evaluator scores, defined as follows. A Suggester score is a parameter or set of parameters calculated in some embodiments for each Suggester for a given Decision, and determines how the Suggester's suggested Options are weighted in determining the model's outputs, such as the Option score. The Suggester score may be strongly influenced by their inferred performance in providing astute suggestions for the Decision, and less strongly influenced by their performance on other, less-related Decisions. The score may itself be a function of the Option—a Suggester may suggest good fiction books but poor biographies, for example. The score may be higher if the suggested Options tend to get good evaluations, or have good outcomes.

An Evaluator score is a parameter or set of parameters calculated in some embodiments for each Evaluator for a given Decision, and determines how the Evaluator's evaluations are weighted in determining the model's outputs, such as the Option score. The Evaluator score may be strongly influenced by their inferred performance in providing astute evaluations for the Decision, and less strongly influenced by their performance on other, less-related Decisions. The score may itself be a function of the evaluation—some Evaluators may be accurate at predicting good Options, while others may be accurate at predicting poor Option, for example. The score may be higher if the Evaluator's ratings tend to correlate with the Subject's ratings, or with the Recommendation outcomes.

The output of the model is a comparison of the Options, such as Option scores, a type of weighting. An Option score is a value or set of values calculated in some embodiments for each Option for a given Decision, and used to compare Options. In some embodiments, the Option score is a prediction of how the Subject would rate the Option. In some embodiments, the Option score is a prediction of the outcome if a Recommendation were to include the Option. In some embodiments, the Option score is a simple average of all the Evaluators ratings. In some embodiments, the Option score is affected by the Suggester score(s) of the Suggester(s) who suggested the Option, and the evaluations are rated by the corresponding Evaluations scores. In some embodiments, the Option score is a ranking. The Option score may include an associated certainty, or the Option score may be a probability distribution function. The output of the model may also include an indication of certainty, used to determine if more Evidence is needed, and what questions to ask whom. The output may also include role assignments, such as which Suggester or Evaluator to solicit. Ultimately, the goal of the statistical model is to predict the best Recommendation(s), while attempting to minimize the burden on the Suggesters and Evaluators.

In a preferred embodiment, the statistical model follows the following process. For each Decision, it assigns a probability distribution function to each Option, parametrized by a set of quantities that together constitute the Option score. The sample space of each function is the set of possible outcomes of a Recommendation of that Option, for example, the number of units purchased, or the self-reported satisfaction of the Subject. The sample space may be continuous or discrete depending on the application, in which case the functions are probability density functions or probability mass functions, respectively. Each Suggester is assigned two such functions—one corresponding to the population of Options suggested by the Suggester, and the other to the population of other Options. The parameter sets of both functions taken together constitute the Evaluator score.

The Evaluator score is "high" when the mean of the "suggested" function is higher than the mean of the "other" function. Each Evaluator is assigned a parametrized function whose input is a rating, and whose output is a probability distribution function similar to those assigned to Options. The parameters of the Evaluator's function constitute the Evaluator score. The Evaluator score is "high" when a probability distribution function corresponding to a higher rating has a higher mean than one corresponding to a lower rating, meaning, that high ratings from the Evaluator correspond to better outcomes. The Subject also receives an Evaluator score if the Subject has provided any ratings. At this point, the statistical model is set up, and can be iterated as follows.

Continuing with the preferred embodiment, the system calculates the Bayesian prior probability function (prior) for the set of all scores defined above by performing a Bayesian average of each Option/Suggester/Evaluator's historical score on previous Decisions, heuristically weighted according to similarity with the present Decision, with the overall population average. Thus, all Decisions with overlapping users or Options are interconnected. The system then calculates the consistency of the set of scores. The consistency is defined here as the joint posterior probability of the scores given the actual outcome of prior Recommendations. The calculation requires an integral for each Option in each Decision; in the preferred embodiment, conjugate priors are used whose integrals are analytically solvable, otherwise quadrature can be used. Finally, the consistency is maximized using any numerical optimization approximation method, and continually re-run as needed. In practice, it is not necessary to recompute the scores systemwide each iteration; the system can use older scores to compute newer scores in bootstrap fashion.

The end result is a set of parameters—the Suggester scores, Evaluation scores, and Option scores—that allows the system to compare Suggesters, compare Evaluators, compare Options, and estimate the certainty of those comparisons.

In any embodiment, at some point based on the known evaluations and inferred weights, the statistical model may infer that a particular Option(s) has a high probability of satisfying a certain Subject's Decision. The system may attempt to optimize several Recommendations simultaneously; for example, if the system has reason to limit the number of times or frequency an Option is recommended. In Decisions that require only one Option, the system may instead consider the probability that the top Option is better than the second-best Option (this consideration may be generalized to Decisions requiring at most N number of Options). If the computed confidence is above a certain threshold, then the system issues a Recommendation. The Server Program 320 makes a new entry into the Server Memory Recommendations database 309. These databases are synced with the appropriate user Client Program(s) 420—the Subject and possibly the Option and some Evaluators and Suggesters—so that those users are notified of the Recommendation the next time they use the application. In some embodiments, the Server Program 320 may require other conditions to be met before it makes a Recommendation. For example, it may limit the frequency of Recommendations that Subjects receive. Or, it may require that the Subject or Option is online before it makes a Recommendation. In embodiments where the Options are reciprocally also Subjects, the Server Program may require that the Recommendation is mutual according to the statistical model.

Another function of the Server Program 320 is to follow up on a Recommendation 334 to determine the quality of the outcome. In some embodiments, the Client Program 420 and Server Program 320 may monitor the outcome of Recommendations 334, 434. Raw data about the Recommendation—whether the user purchased a product or initiated a chat, for example—is transmitted by the Client Program 420 to the Server Program 320. The Server Program 320 determines a degree of success for the Recommendation, and adds this information to the appropriate entry in the Server Memory Recommendation 309 and Evidence 308 databases. In some embodiments, the Subject may be shown a survey on the Client Interface 460; the Client Program 420 then relays the survey responses to the Server Program 420. Follow-up information is used when the Server Program 320 runs the statistical model, to inform future calculations. In general, Evaluators whose ratings accurately predict the outcome of Recommendations will be assigned higher weights by the statistical model.

The Client side is made up of a Client Memory 400, a Client Program 420, and an Internet connection 450 to the Server Program 320 on the Server side. The Client side also contains a Client Interface 460 which allows the user to visually interact with the Client Program 420 and communicate information to the system.

The Client Memory 400 is the local database on each user device. It includes a Client Memory User's Database 401 containing a subset of the Server Memory Users database 301 containing the entry for the user, and the public part of other users as necessary, such as Friends and Options (if applicable), whose names and headshots may be displayed at times.

The Client Memory 400 may contain a Client Memory Friends database 402 containing a subset of the Server Memory Friends database restricted to people who are the user's Friends.

The Client Memory 400 may also contain a Client Memory Decisions database 403 containing a subset of the Server Memory Decisions database 303 of Decisions for which the user is a Subject, Suggester, or Evaluator.

The Client Memory 400 may also contain a Client Memory Options database 404 containing a subset of the Server Memory Options database 304 of Options that the user may have reason to interact with in some way—such as Options that will be displayed for the user to evaluate, Options for the user's own Decision(s), and Options that the user has suggested.

The Client Memory 400 may also contain a Client Memory Serve Queue database 405 containing a subset of the Server Memory Serve Queue 305 for which the user is to act as Evaluator.

The Client Memory 400 may also contain a Client Memory Conversations database 406 containing a subset of the Server Memory Conversations database 306 of conversations in which the user is a participant.

The Client Memory 400 may also contain a Client Memory Evaluations database 407 containing a subset of the Server Memory Evaluations 307 for which the user is either an Evaluator or the Subject.

The Client Memory 400 may also contain a Client Memory Recommendations database 408 containing a subset of the Server Memory Recommendations database 309 for which the user is the Subject. In some embodiments, other users such as Friends of the Subject may have records of the Subject's Recommendations in their client database.

The Client Memory 400 may also contain a Client Memory User Activity database 409 containing records of recent activity by the user yet to be uploaded to the Server Memory User Activity database 310.

The Client Memory 400 may also store Local Data 410 including any data needed to keep the user experience consistent between usages, such as language settings, last Subject selected, etc. Although primarily intended to be stored on the user device, this data may be duplicated in the Server Memory 300 to facilitate the user's switching between multiple devices.

The Client Program 420 has several functions which complement the functions of the Server Program 320 as described above. In communication with the Server Program 320, the Client Program 420 syncs the Client Memory to the Server Memory 421.

Another function of the Client Program 420 is to collect signup information or collect login information 422 from the user upon entering the program. This information is then sent to the Server Program 420 to be stored or validated 322.

Another function of the Client Program 420 is to collect profile information 423 to be sent to the Server Program 320 via the internet 450 for validation and storage 323.

Another function of the Client Program 420 is to acknowledge addition and removal of Friends 424. This information is sent via the Internet 450 to the Server Program 320, which stores any changes to Friends 324.

Another function of the Client Program 420 is to collect information about Decisions 425. This information is sent via the Internet 450 to the Server Program 320, which stores the information in the Server Memory 400.

The client side may also optionally be connected via the Internet 450 to one or more external Social Graphs or Social Databases 455 (such as one belonging to an existing social networking site), or to External sites with Product Services, Directories, etc. 456.

Another function of the Client Program 420 is to gather users' preferences for roles 426. In some embodiments, the Subject chooses the roles for all their Decisions, or on a per-Decision basis. In some embodiments, the Subject may enter selections for roles, or preferences which the Server Program 320 attempts to honor, with consideration of other users' preferences. In some embodiments, users may opt into roles freely. In other embodiments, users may opt in, but the Subject must approve roles. In some embodiments, users may register and verify their expertise in a certain field, and this status may be used to preferentially determine roles. In embodiments with Friends, any Friend of the Subject may serve in any of the Subject's Decisions. Any aforementioned relationship or data may be stored by the Client Program 420 in the Client Memory Users database, and synced via the Internet 450 to the Server Program 320, which stores the information in the Server Memory Users database 301 for future reference. Role assignments made on a per-Decision basis may be relayed for storage in the Server Memory Decisions database 303. In some embodiments, a Decision's Suggesters and Evaluators carry over to the Subject's next Decision. Role assignments made on a per-Subject basis may be relayed for storage in the Server Memory Users database 301 in the entry for the Subject. In some embodiments, every member of a Subject's Friend Set is a Suggester and an Evaluator for the Subject's Decisions, and this step is trivial. In some embodiments, any user may serve in any role for all Decisions, in which case no role assignment records are needed.

Another function of the Client Program 420 is to collect suggestions for Options 427. The Client Interface may contain a button for adding an Option to a Decision. The Client Program 420 collects information about the Option from the user and transmits the information via the Internet 350 to the Server Program 320, which stores the information 327 in the Server Memory Options database 304 if the Options are not already present there (from another Decision). The Server Program checks that the new Options satisfy the Decision criteria for which they were chosen, and registers the Options in the Server Memory Decisions database 303.

Another function of the Client Program 420 is to allow Evaluators to select the mode, described previously, by which Options are received and displayed 428. This information is sent to the Server Program 320 which stores the preferred mode for sending Options 328 to the user.

Another function of the Client Program 420 is to manage Option data 429 so that it is available whenever a user needs to view an Option, such as when a Subject is looking over a Decision, or when an Evaluator is shown the next Option from the Serve Queue, or when users navigate to an Option via the feature that allows users to embed links to Options in a chat. When the Client Program 420 determines that an Option needs to be displayed, or will need to be displayed soon, it requests the detailed Option data from the Server Program 320, which relays the data from the Server Memory Options database 304. In some embodiments, the Client Program 420 formats data from the Client Memory to display the information in human-readable form. The Client Program 420 may provide detailed information about the Option from the Client Memory Option database 404, as well as prior evaluations of the Option from the Decision's other Evaluators, or the identity of the Suggester(s).

Some of the data in the Client Memory Option database 404 may be links to external data, in which case the Client Program 420 downloads the linked data and formats it for display through the Client Interface 460. In some embodiments, the Evaluator may be able to interact with the displayed Option. In some embodiments, pertinent details about the Subject are displayed concurrently with the Option when the Option is displayed to a Suggester or Evaluator. The Client Program 420 may delete unneeded Option data to clear up space on the client device. In this way, the data to display an Option is ideally available before it is needed.

Another function of the Client Program 420 is to collect evaluations from users 430. The Client Program 420 gathers the information for the evaluation which is entered by the Evaluator into the Client Interface 460. This information is sent to the Server Program 320 which stores it in the Server Memory as a new evaluation 330. Immediately after the user finalizes the evaluation, the Client Program 420 removes the Option from the Client Memory Serve Queue 405.

Another function of the Client Program 420 is to request new Options as needed 431 to maintain a buffered Serve Queue 405, receive them 431 when they are sent by the Server Program 320, store the data into the Client Memory Options database 404, and store links to the Options in the Client Memory Serve Queue 405. After an evaluation, or after the user initialization process, the Client Program selects the next Option(s) to be displayed from the Client Memory Serve Queue 405, based on the mode selected by the user. Then, the Client Program 420 displays information about the Option(s) 429 on the Client Interface 460 and provides a means for the Evaluator to input an evaluation. Finally, the user may choose to Evaluate the Option.

In embodiments with a chat feature, another function of the Client Program 420 is to collect and display messages 432 between users. Collected messages are sent to the Server Program 320 which stores and relays the messages between users 332.

Another function of the Client Program 420 is to receive notice of Recommendations 433 once a Recommendation is determined by the statistical model and notice of the Recommendation is sent by the Server Program 333. The Client Program 420 and Server Program 320 periodically communicate via the Internet 450 in order to sync the Client Memory Recommendations database 408 and Server Memory Recommendations database 309. In this way, the Client Program 420 receives updates about new Recommendations. For each of the user's Recommendations, the Server Program 320 and Client Program 420 also coordinate to ensure that any necessary information about the Recommendation is synced from the Server Memory to the Client Memory 321 via the Internet 350, including information from the Options, Evaluations, and Users databases 304, 307, 301.

When new entries are added to the Client Memory Recommendations database 408, the Client Program 420 issues an audible or visual cue to the user that a new Recommendation has arrived via the Client Interface 460. Once the alert has been received by the user, the Client Program 420 edits the Recommendation entry 408 to reflect the receipt and communicates the receipt to the Server, which edits the Server Memory Recommendations entry 309 accordingly. In some embodiments, the Client Program 420 displays the Recommendation information immediately; in others, the Client Program 420 displays a button that the user may click at any time to see Recommendations. In either case, the Client Program 420 compiles the pertinent information from the Client Memory Recommendations, Options, and Evaluations databases 408, 404, 407, downloads any additional information needed from the Internet 450, and presents this information to the user in human-readable format.

For example, the Client Program 420 may display the Option's name (Client Memory Options database 404), the identity of the Suggester(s) (Client Memory Decisions database 403 or Options database 404), evaluations from Evaluators (Client Memory Evaluations database 407), and if the Option is a user, biographical information (Client Memory Users database 401). Along with displaying information about the Recommendation, the Client Program 420 may display input mechanisms for the user to interact with the Recommended Option, appropriate for the given application. For example, there may be a button to trigger a purchase in the case that the Option is a product or service. Or, there may be a button to initiate a chat between the user and the Option in the case of social matching applications. Or, there may be a button to simply accept or reject advice. In all cases, the user may eventually close the Recommendation screen and perform other functions.

After a Recommendation is issued, the Client Program 420 may follow up on the outcome of a Recommendation 434 by itself or in collaboration with the Server Program 334.

The primary function of the Client Interface 460 is to serve as an intermediary between the user and the Client Program 420. In embodiments that involve a desktop or mobile device with a screen, features of the Client Interface 460 may appear together on the same screen, as part of separate screens, or a combination thereof. For example, on a smartphone device, the Client Interface 460 may be broken up into a series of screens, each focused on a specific task or aspect of the Client Interface 460. In the preferred embodiment, the Client Interface 460 includes a way for the user to create a new account. If the user already has an account, the Client Interface 460 includes a way for the user to log in and authenticate their account.

In some embodiments, the Client Interface 460 has a screen for each user to make a personal profile with text and pictures, which may be used to identify the user to other users. In embodiments with Friends, the Client Interface 460 includes a way for the user to manage his or her Friend Set, which involves a means to invite other users to become Friends, delete current Friends, and review Friend requests from other users. In embodiments where the Decision is not implicit, the Client Interface 460 includes a way for a Subject to input a Decision to be made and/or a way for a user or algorithm to input a Decision to be made on a Subject's behalf. The Client Interface 460 includes mechanisms for a Subject to specify criteria for a Decision.

In embodiments where the system is not acting as the sole Suggester, and thus needs Suggesters to suggest Options, the Client Interface 460 includes a way for a Suggester to do this. In embodiments with standalone Options, the Client Interface 460 includes mechanisms for entering in information about the Option; if the Option is a person, the information may be biographical or autobiographical. In the preferred embodiment, the Client Interface 460 includes a way for an Evaluator to consider Options. For example, the Client Interface 460 may display text, video(s), and/or an image(s) related to an Option on a screen and/or play audio related an Option. The Client Interface 460 includes a way for an Evaluator to input an evaluation; among other things, this could take the form of one or more buttons, a slider bar, text box in which the Evaluator is asked to provide a written review, a way to capture a verbal comment, or any combination thereof.

The Client Interface 460 includes a way for a Subject to receive a Recommendation and review past Recommendations. For example, a Recommendation may appear as text, video(s), and/or an image(s) on a screen, as audio, or as a combination thereof. In some embodiments, the Client Interface 460 provides mechanisms for the Subject to interact with the Recommendation, for example, a button to purchase the Option (if a product) or a button to initiate a chat with the Option (if a user). The displayed Recommendation may include a mechanism for the Subject to provide feedback on the Recommendation. The Client Interface 460 may also track and update GPS position and make a tone to notify the client when a Recommendation is received. In different embodiments, various features of the Client Interface 460 may be limited by role. For example, in one embodiment, a user who is an Evaluator but not a Suggester may only see features related to considering and providing evaluations. In another embodiment, it may be possible for a user to see all aspects of the Client Interface 460 and play different roles (Subject, Suggester, Evaluator, Option) based on the actions they take.

FIG. 5 shows an example of the Client Interface 500 of an embodiment of the present system, tailored to making Social Recommendations, common in online dating and social networking. A Social Recommendation is a Recommendation in which Options for a Subject take the form of another Subject(s). By reciprocity, each Subject may be an Option for another Subject. Social Recommendations may take the form of 1-to-1, 1-to-many, many-to-1, or many-to-many, where "many" represents any number of Subjects greater than 1. For example, "1-to-many" refers to one Subject being recommended to many other Subjects.

In some embodiments, Subjects may opt in or out of being included as an Option. In some embodiments, Subjects may be categorized into types, and certain types may be Matched exclusively or preferentially with certain other types, with the same type. A Social Recommendation may be made reciprocally, in which case it is called a Matching or Grouping, depending on whether the number of Subjects is 2, or greater than 2, respectively. A Grouping is a mutual Recommendation of several entities, where at least two entities are Subjects, and any remainder are Options. For example, the system may issue a Recommendation that several Subjects share a ride with a certain taxi company (Option). A Matching is a reciprocal Recommendation of two Subjects to each other, for example, in a dating application. Groupings may vary in number of Subjects or be limited in size, depending on the embodiment. In addition, Subjects may be categorized into various types, and these types may factor into the composition of Matchings or Groupings. Although the system has full knowledge of the composition of a Grouping, some Subjects may not see their connections to all the other Subjects. Any two Subjects in a Grouping may be connected one-way (one is a recommended Option for the other), two-way, or not directly connected. Groupings may also contain Options that are not Subjects, such as several Subjects seeking a ride to the airport entered into a Grouping with a taxi that is an Option.

The Client Interface 500 shows the point of view of an Evaluator. The Client Interface 500 is made up of a number of icons, buttons, images, and other elements. They include a button that identifies the currently-selected Subject and allows the user to change Subjects 510, a button that opens a menu (not shown) of other screens for the user 550, a button that opens a chat tool (not shown) for the user 560, an image of an Option 530 along with additional information about the Option 580, a button that takes the user to a menu (not shown) of different ways to interact with an Option 570, and an input mechanism for a user to provide a rating 540. In this case, the input mechanism 540 is a slider bar. Two of the Subject's Friends 520 have already provided ratings of the Option 530 on behalf of the Subject 510. The Friends' ratings 520 are indicated below the slider bar. In this case, both Friends have given the same high rating. In this example, the embodiment of the present system is being used to make Recommendations of Options for a 1-to-1 Matching with the Subject 510. The Option shown 530 is another user who is also considered a Subject, and has her own Friends to serve as Evaluators on her behalf. The system analyzes ratings from both Subjects' Evaluators, which may include the Subjects themselves, and decides whether or not to Match the two Subjects. In this case, a Match equates to a Recommendation that the two Subjects pursue a romantic relationship with one another.

FIG. 6 shows another example of the Client Interface 600 of an embodiment of the present system tailored to making Recommendations of products for a Subject 610 to buy. Once again, the point of view of an Evaluator is shown. As in FIG. 5, the Client Interface 600 in FIG. 6 is made up of a number of icons, buttons, images, and other elements. They include a button that identifies the currently-selected Subject and allows the user to change Subjects 610, a button that opens a menu (not shown) of other screens for the user 650, a button that opens a chat tool (not shown) for the user 660, an image of an Option 630 along with additional information about the Option 680, a button that takes the user to a menu (not shown) of different ways to interact with an Option 670, an image of an Option 630 along with additional information about the Option, and an input mechanism for a user to provide a rating 640, which in this case is a slider bar. Two of the Subject's Friends 620 have already provided ratings of the Option 630 on behalf of the Subject 610. The Friends' ratings 620 are indicated below the slider bar. One Friend rated high, while the other Friend rated low. The Option shown 630 is a car for sale, which the seller listed, and potentially suggested, as an Option.

Figure 7:
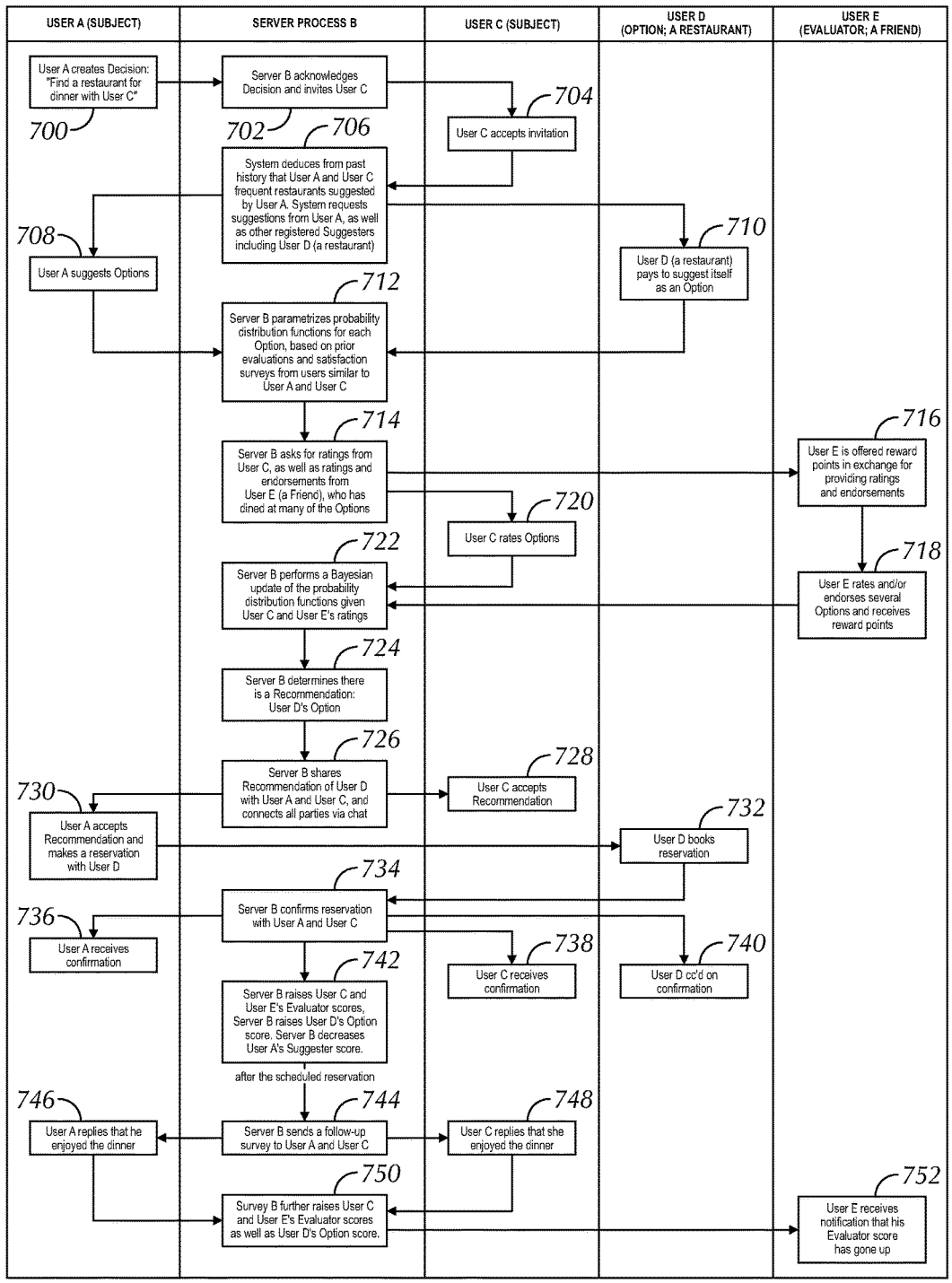
FIG. 7 illustrates an example embodiment in which a Subject is requesting a restaurant recommendation.

FIG. 7 shows an example embodiment of the present invention, in which a user, User A, uses the system, which includes Server B, to find a restaurant for a dinner with another user, User C. First, User A creates a Decision: "Find a restaurant for dinner with User C." 700. Server B acknowledges User A's Decision, establishes the pair User A and User C as the Subject, and invites User C to join the Decision 702. User C receives and accepts the invitation 704.

The system deduces from past history that User A and User C frequent restaurants suggested by User A. Accordingly, the system requests suggestions from User A, as well as from some other registered users, including User D, a manager representing a restaurant 706. User A suggests Options 708. User D pays to suggest his or her restaurant as an Option 710. Server B receives the suggestions. For each restaurant Option, Server B parametrizes a probability distribution function that the Option will be satisfactory for both User A and User C, based on prior evaluations and prior satisfaction surveys from users similar to User A and User C who have dined at the Option 712.

Server B asks for ratings from User C, as well as ratings and endorsements from another user, User E, a friend of User A and User B who has dined at many of the Options 714. User E is offered reward points in exchange for providing ratings and/or endorsements of the restaurant Options tailored to User A and User C 716. User E accepts the offer, rates and/or endorses several Options, and receives reward points in exchange for his help 718. User C rates Options as well 720.

Server B gathers the ratings and endorsements. Server B performs a Bayesian update of the probability distribution functions given User C and User E's ratings and endorsements 722. Server B determines there is a Recommendation: the restaurant represented by User D is the Option most likely to be satisfactory above a predetermined confidence level 724. Server B shares the Recommendation of User D with User A and User C, and connects all parties via chat 726.

User C accepts the Recommendation 728. User A accepts the Recommendation and makes a reservation with User D over chat 730. User D books the reservation 732. Server B gathers this information and confirms the reservation with User A and User C 734. User A and User C receive confirmation of the reservation 736, 738, and User D is cc'd 740. These users may continue to communicate as necessary.

Server B raises User E's and User C's Evaluator scores, a measure of a user's effectiveness as an Evaluator, since both users rated User D highly. The system increases User D's restaurant's Option score, which improves the chances that User D's restaurant will be recommended to other Subjects. The system increases User D's Suggester score since User D suggested an Option that the Evaluators rated highly, and was ultimately accepted as a Recommendation. The system decreases User A's Suggester score somewhat for suggesting a number of Options that User C did not like 742.

After the scheduled reservation, the server sends a follow-up survey to User A and User C 744. User A and User C reply that they both enjoyed the restaurant experience 746, 748. Therefore, the system further raises User C's and User E's Evaluator scores 750, and User D's Option score. User E receives notification of the successful Recommendation and that his Evaluator score has gone up 752.

The present system has many additional applications. For example, it may be used to improve the hiring process. Suppose a human resources manager is looking for candidates to fill an available job; the human resources manager describes this Decision to the system and takes on the role of a Subject. The human resource manager asks the system for a list of candidates; the candidates are therefore Options. As in other examples, a variety of different Suggesters may put forth Options, and the system solicits evaluations of any number of aspects, pertinent to the job in question, of each job candidate from various Evaluators. The system considers this Evidence and may, at some point, make a Recommendation to the human resources manager. The system may also notify the other parties involved.

As in the Social Recommendation use case, the scope of the human resources manager's Decision is not necessarily limited to one Option; the human resources manager may want to hire a team, which resembles a Grouping, and involves multiple dimensions of evaluation; for example, evaluations of Options as individuals, as well as evaluations of how one Option might work with another. Additionally, some or all of the job candidates may also have asked the system to help them find a job; if so, these job candidates serve as Subjects in their own Decision, to find the best job, in which the Options are different job openings. At the same time, they are Options in the human resources manager's Decision, to find the best employee.

For a given Decision, say the human resources manager's Decision to find an employee, the system may choose an Evaluator who is unknown to the Subject (human resources manager), but known to the Object (job seeker); for example, the system may solicit an evaluation from a Friend of the job seeker.

In addition, the following is an example application of how the present system may deal with complex Groupings that may arise in a particular embodiment; for example, collating multi-part considerations among parties in different locations that would be difficult in real world. In many professional sports leagues, teams may trade players for other players or draft picks. Such trades sometimes take the form of complex multi-team deals, with each team giving and receiving something in the trade, such as players of various positions, draft-picks, money, etc. Such trades are further complicated by league rules, such as salary caps, and by the desire of each team to maximize their perceived benefit. Additionally, players may have input as to whether they would agree to a trade and under what terms. To complicate matters further, some teams may only accept parts of the deal contingent on other parts, and teams may not be privy to all parts of the overall deal. Finally, the decision-makers on each team may wish to poll various stakeholders to get their input, such as owners, coaches, players, or fans. The present invention handles such a case by acknowledging a distinct Decision for each team and each player, where each entity is its own Subject, and the system's Recommendations are interconnected.

The following is an explanation of how an embodiment of this invention tackle this problem, and by analogy, any complex arrangement with many moving parts and stakeholders. First, the various stakeholders run client instances and register profiles, then the system verifies each person's identity and affiliation with a team. A team's general manager may ask for a specific Recommendation, such as "please find us a new quarterback." Or, the Decision may be implicit—"what trade(s) will benefit my team the most?"—given the general manager's role. Registered general managers are Subjects, because the system will work on their behalf to formulate Recommendations. The embodiment may also act on behalf of other types of people. For example, players may be allowed to register as Subjects for the application and input their desires for Recommendations, e.g. "maximum pay," "go to a winning team," etc. Players who do not register for the application may still be considered for trades, but they will be Options only rather than Subjects and Options. Subjects may choose to enroll friends, family, and coaches to be Evaluators on their behalf. Finally, other users such as coaches and fans may register as Evaluators.

Using various optimization methods, such as fair cake-cutting algorithms, the system attempts to find trades that optimize the outcomes for all parties and satisfy all constraints. Certain parties may be prioritized higher or lower depending on the implementation. The system may attempt to gather more Evidence to use in making better Recommendations and/or to better support Recommendations. For example, the system may ask various participants how fanbase approval affects their Decision. Depending on the answer, the system may poll members of the fanbase. The system may make use of player statistics from prior games, data that may be downloaded from a league website. Or, the system may request evaluations from certain experts, who may or may not already be registered users.

At some point, the system's algorithms may find a trade that it believes would be acceptable to all involved parties. The overall Recommendation, which may include many teams and players, is broken down into individual Recommendations for each entity, which may include a proposed team/player, suggested salary, and contract clauses. An individual Recommendation may or may not include information about the overall Recommendation. The system issues each individual Recommendation to all involved parties via the application or other means, possibly mailing letters to parties that are not registered as Subjects.

Recommendations may include aspects of the system's Evidence that support the Recommendation, thus making a case for the Recommendation. A Recommendation for a player may show relevant evaluations from friends and family. It may also contain popularity polls for the player in the new team's city.

The entities respond to the system with approval, conditional approval, or disapproval. If all entities approve, the system may take actions such as issuing contracts or registering the deal with the sports league. Otherwise, the system may amend the deal, parts of the deal, etc. This process may be repeated as needed.

Finally, the system updates its Evidence relating to each team and player, especially which factors and friends were most influential. The system may track the outcome of the Recommendation, adding that information to its Evidence. It may use this improved Evidence as the basis of Recommendations.

The application of this invention is novel because it combines optimization of a complex system, with personal input from the decision-makers' friends and fans to persuade the decision-makers to accept Recommendations.

Other embodiments combine various aspects of the aforementioned embodiments, as well as various additional aspects in keeping with the spirit of the invention. In general, the invention can be applied to any situation involving pairing things or people with other things or people, in a context where peer analysis and evaluation is valuable, and in which users contribute to a better understanding of other users to such an extent that a suggestion, recommendation, or introduction may be made on their behalf.

While the present invention has been described in terms of a system implemented over a public network, such as the Internet, methods of the present invention can also be implemented over a private network and even without a network.

The invention claimed is:

1. An electronic system for generating recommendations relating to a decision for a subject comprising:
    a server memory comprising:
        a record of user profile information;
        a record of the decision for the subject;
        a record of options relating to the decision;
        a record of evaluations of the options;
        a record of options proposed by system users in prior decisions; and
        a record of conversations between system users;
    a connection for communicating with one or more client devices, wherein said connection is configured to facilitate system users to engage in conversations recorded by the system;
    a server configured to cause performance of functions, said functions including:
        syncing data received through said connection with client devices with said server memory;
        recording new decisions into the record of decisions in said server memory;
        recording options into the record of options proposed by users in said server memory;
        recording evaluations provided by system users into the record of evaluations in the server memory;
        issuing a recommendation based, at least in part, on evaluations of suggested options;
        gathering feedback after a recommendation has been issued;

storing information about said feedback in said server memory;

calculating an assigned option score for each option of a set of options, said assigned option score being calculated using a function with inputs, said inputs comprising:

evaluations received relating to the decisions;

accuracy of each evaluator, said accuracy being determined based on information gathered by the system about the outcome of prior decisions;

comparing each option of the set of options to other options using the assigned option score;

causing display:

(i) information related to at least one option of said set of options to a system user, and (iii) a button configured to initiate conversation between at least two system users;

wherein said server is further configured to initiate, responsive to selection of the button, a conversation and embed content relating to the at least one option of said set of options into the initiated conversation.

2. An electronic system for generating recommendations relating to a decision for a subject comprising:

a server memory comprising:
  a record of user profile information;
  a record of the decision for the subject;
  a record of options relating to the decision;
  a record of evaluations of the options; and
  a record of conversations between system users;

a connection for communicating with one or more client devices, wherein said connection is configured to facilitate system users to engage in conversations recorded by the system;

a server configured to cause performance of functions, said functions including:

syncing data received through said connection with client devices with said server memory;

recording new decisions created by system users into the record of decisions in said server memory;

recording options suggested by system users into the record of options proposed by users in said server memory;

recording evaluations provided by system users into the record of evaluations in the server memory; and issuing a recommendation based, at least in part, on evaluations of suggested options;

causing display of at least one option and a button configured to initiate a conversation between at least two system users;

initiating a conversation in response to selection of the button; and, embedding content related to the at least one option into the conversation;

a client side, wherein said client side comprises:
  a client interface;
  a client memory comprising:
    a subset of said record of user profile information stored on said server memory;
    a subset of said decisions on the subject stored on said server memory; and
    a record of new decisions, options, or evaluations entered by one of the system users into the client interface not yet synced with said server memory;
  a client program configured to perform functions comprising:
    syncing information stored in said server memory with information stored in said client memory; and
    recording new decisions, options, or evaluations entered by the user through the client interface into the record of new decisions in said client memory, wherein the client side and server side are connected through said connection.

* * * * *